United States Patent
Ferguson

(10) Patent No.: US 8,234,747 B1
(45) Date of Patent: Aug. 7, 2012

(54) WINDSHIELD WIPER ASSEMBLY

(76) Inventor: Harold D. Ferguson, Havre, MT (US)

(*) Notice: Subject to any disclaimer, the term of this patent is extended or adjusted under 35 U.S.C. 154(b) by 22 days.

(21) Appl. No.: 12/765,244

(22) Filed: Apr. 22, 2010

(51) Int. Cl.
*B60S 1/38* (2006.01)

(52) U.S. Cl. .............. 15/250.41; 15/250.4; 15/250.22; 15/250.361

(58) Field of Classification Search .............. 15/250.41, 15/250.4, 250.22, 250.361, 245, 250.48, 15/250.44, 250.43
See application file for complete search history.

(56) References Cited

U.S. PATENT DOCUMENTS

| | | | |
|---|---|---|---|
| 2,569,635 A * | 10/1951 | Holmes | 15/250.1 |
| 2,689,369 A * | 9/1954 | Bick | 15/245 |
| 3,115,656 A * | 12/1963 | Mckinstry | 15/115 |
| 3,892,006 A * | 7/1975 | Yasumoto | 15/250.22 |
| 3,939,524 A | 2/1976 | Knights | |
| 4,339,839 A | 7/1982 | Knights | |
| 4,611,364 A * | 9/1986 | Grubner | 15/250.22 |
| 4,745,653 A * | 5/1988 | Bliznak | 15/250.04 |
| 4,754,517 A | 7/1988 | Aldous | |
| 5,257,436 A | 11/1993 | Yang | |
| 5,392,488 A | 2/1995 | Li | |
| 5,732,437 A * | 3/1998 | Jonasson et al. | 15/250.201 |
| 5,778,483 A | 7/1998 | Dawson | |
| 6,161,247 A * | 12/2000 | Breau et al. | 15/250.01 |
| 6,665,904 B1 | 12/2003 | Kerchaert | |
| 6,799,349 B2 | 10/2004 | Stouder, II | |
| D508,888 S | 8/2005 | Carroll | |
| D537,769 S | 3/2007 | Duvall, Jr. | |
| 7,334,288 B2 * | 2/2008 | Rudd et al. | 15/250.41 |
| 2009/0064437 A1 * | 3/2009 | Miller | 15/250.22 |

* cited by examiner

*Primary Examiner* — Gary Graham
(74) *Attorney, Agent, or Firm* — Montgomery Patent & Design, LLC; Robert C. Montgomery; Joseph T. Yaksich

(57) ABSTRACT

A vehicle windshield wiper blade having multiple cleaning elements which are rotatable to provide a new cleaning surface is herein disclosed. The wiper blade is arranged such that two (2) rubber blades and one (1) bristle brush are in contact with a windshield surface at all times during use. The wiper blade allows is rotatable and lockable in ninety degree (90°) increments as needed, thereby extending a useful life. The wiper blade is supported by a rod structure which is attached to an existing vehicle wiper arm in a conventional manner. As the wiper blade traverses the windshield, the brush scrubs the windshield, removing splattered and stuck-on debris, while the outer blades sweep water and residue away.

16 Claims, 3 Drawing Sheets

WINDSHIELD WIPER ASSEMBLY

RELATED APPLICATIONS

The present invention was first described in a notarized Official Record of Invention on Nov. 13, 2008, that is on file at the offices of Montgomery Patent and Design, LLC, the entire disclosures of which are incorporated herein by reference.

FIELD OF THE INVENTION

The present invention relates generally to motor vehicle windshield wipers, and more particularly, to a windshield wiper blade with an integral brush.

BACKGROUND OF THE INVENTION

Maintaining a clean automobile windshield is a necessary step in order to ensure safe driving. Windshield wipers are important to remove rain, snow, and other aqueous substances. Windshield wipers typically provide a longitudinal frame with a flexible rubber squeegee attached to the frame. The frame is attached to a motorized motor vehicle wiper arm which directs the wiper in a back-and-forth motion across a surface of the windshield to remove the rain, snow, or other debris. It is also common for motor vehicles to provide a spraying mechanism to deliver a cleaning solution or wiper fluid to the windshield. The wipers are typically used to sweep away the cleaning solution from the windshield in an attempt to clean dirt from the windshield.

However, other substances such as splattered bugs, bird droppings, frost, tree sap and the like, generally require manual scrubbing with some type scrubbing pad or brush to remove those substances from the windshield. The wiper fluid and windshield wipers are unsatisfactory to adequately clean these substances while driving and tend to only smear the substance. This is not only an inconvenience, but a safety hazard, as these substances accumulate during driving.

A number of attempts have been made to provide improvements and modifications to conventional windshield wiper design to solve this problem. These solutions include increasing the contact pressure applied to the windshield by the wiper blade, providing ribbed blades, providing brush material disposed with the wiper blade, or providing a system to deliver cleaning solution to the windshield.

While these solutions may provide some benefit related to their respective, particular objectives, each suffers from one (1) or more disadvantage or deficiency with respect to design, function, or effectiveness. These devices fail to provide a simple yet effective means to remove stuck on substances and other smeared debris, which is inexpensive to manufacture and provides an extended life of the wiper blade.

Accordingly, a need exists for a means by which motorists can maintain a windshield free from bugs, bird droppings and similar debris without the need to stop the vehicle and manually scrub the windshield. The development of the present invention substantially departs from the conventional solutions and in doing so fulfills this need.

SUMMARY OF THE INVENTION

In view of the foregoing art, the inventor recognized the aforementioned inherent problems and observed the need for a novel means by which motorists can maintain a windshield free from stuck on and smeared debris without the need to stop the vehicle and manually scrub the windshield, and thus, the object of the present invention is to solve the aforementioned disadvantages and provide for this need.

Another object of the present invention is to provide a device which can easily attach to all models and types of motor vehicle wiper arms.

Another object of the present invention is to provide a device which functions like a wiper blade squeegee to effectively sweep away liquids from a windshield surface.

Another object of the present invention is to provide a device which functions like a scrub brush to effectively scrub away stuck on and smeared solid debris.

Yet another object of the present invention is to provide a device which has an extended useful life.

Yet another object of the present invention is to provide a device which is quickly and easily replaced as needed by a motorist.

Yet another object of the present invention is to provide a system which is simple and intuitive to use with little to no training.

Yet another object of the present invention is to provide a system which is durable and economical to manufacture.

To achieve the objects of the invention, embodiments of the present device includes a windshield wiper assembly comprising an elongated wiper core having an exterior surface and pair of sidewalls, a plurality of wiper blades extending longitudinally along the wiper core to remove liquids from a windshield, a plurality of wiper brushes extending longitudinally along the wiper core to remove particulate debris from the windshield, a support structure with a pair of engaging arms removably connected to said wiper core and a mounting fixture removably attached to a wiper arm of a motor vehicle, and a locking means to secure the wiper core at a plurality of operating positions.

In a preferred embodiment, at least two of the wiper blades and at least one the wiper brushes are in coincidental contact with a surface of the windshield at each of the plurality of operating positions. The invention provides four (4) operating positions at ninety degree (90°) increments. The wiper blades are disposed at ninety degree (90°) intervals around a circumference of the core and the wiper brushes are disposed at ninety degree (90°) intervals positioned between two (2) wiper blades. A rod aperture in a center of each sidewall of the wiper core insertingly receives the pair of engaging arms, such that the wiper core is rotatable about the pair of engaging arms.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
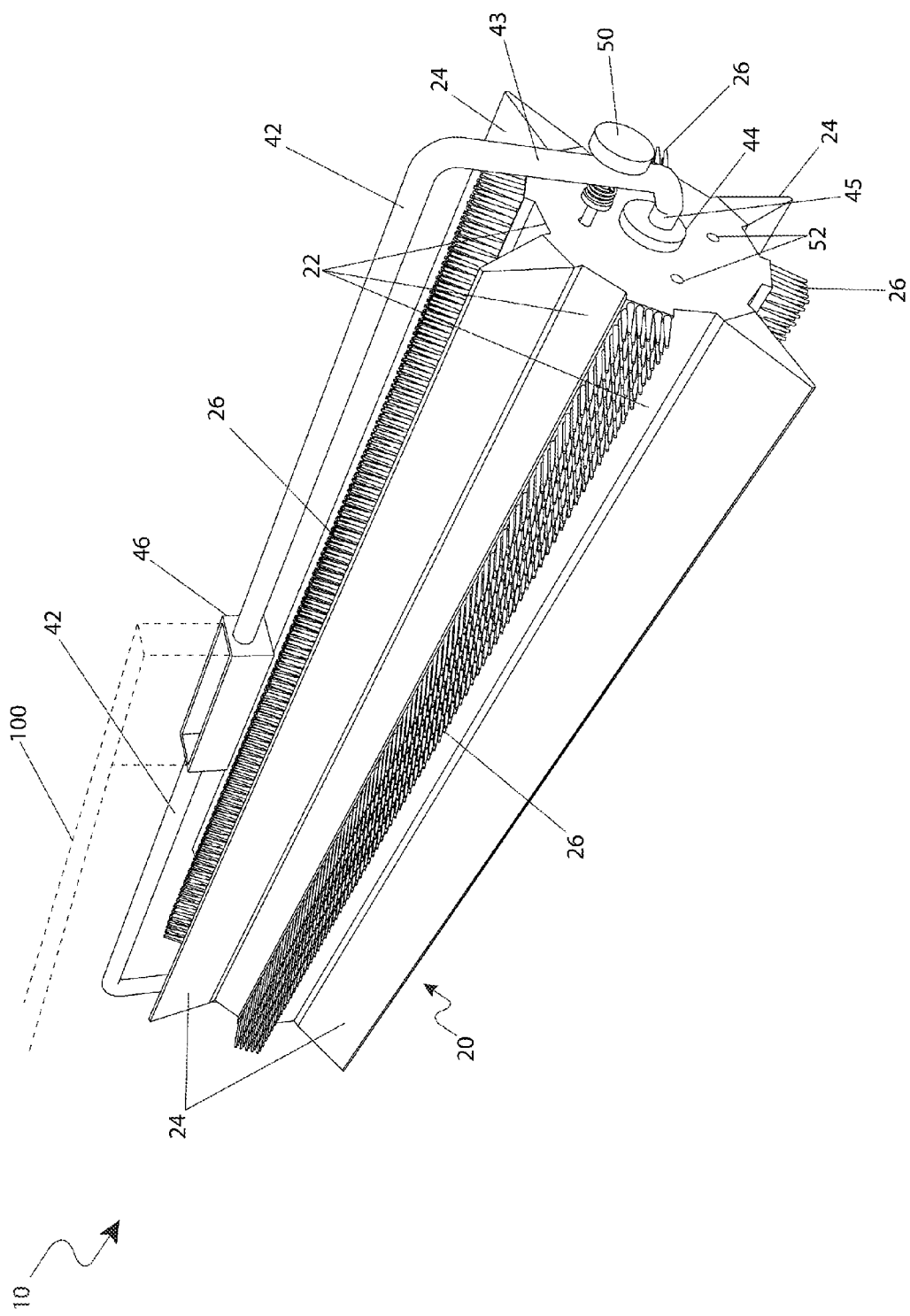
FIG. 1 is a perspective view of a windshield wiper blade with integral brush 10, according to a preferred embodiment of the present invention.

DESCRIPTIVE KEY 10 windshield wiper blade with integral brush
20 wiper blade assembly
22 central cylinder portion
24 wiper blade
26 brush
28 rod aperture
42 rod
43 offset rod
44 collar
45 insert rod
46 wiper arm mounting fixture
50 knob
52 locking aperture
54 locking pin
56 spring
100 wiper arm
110 windshield

DETAILED DESCRIPTION OF THE PREFERRED EMBODIMENT

Figure 2:
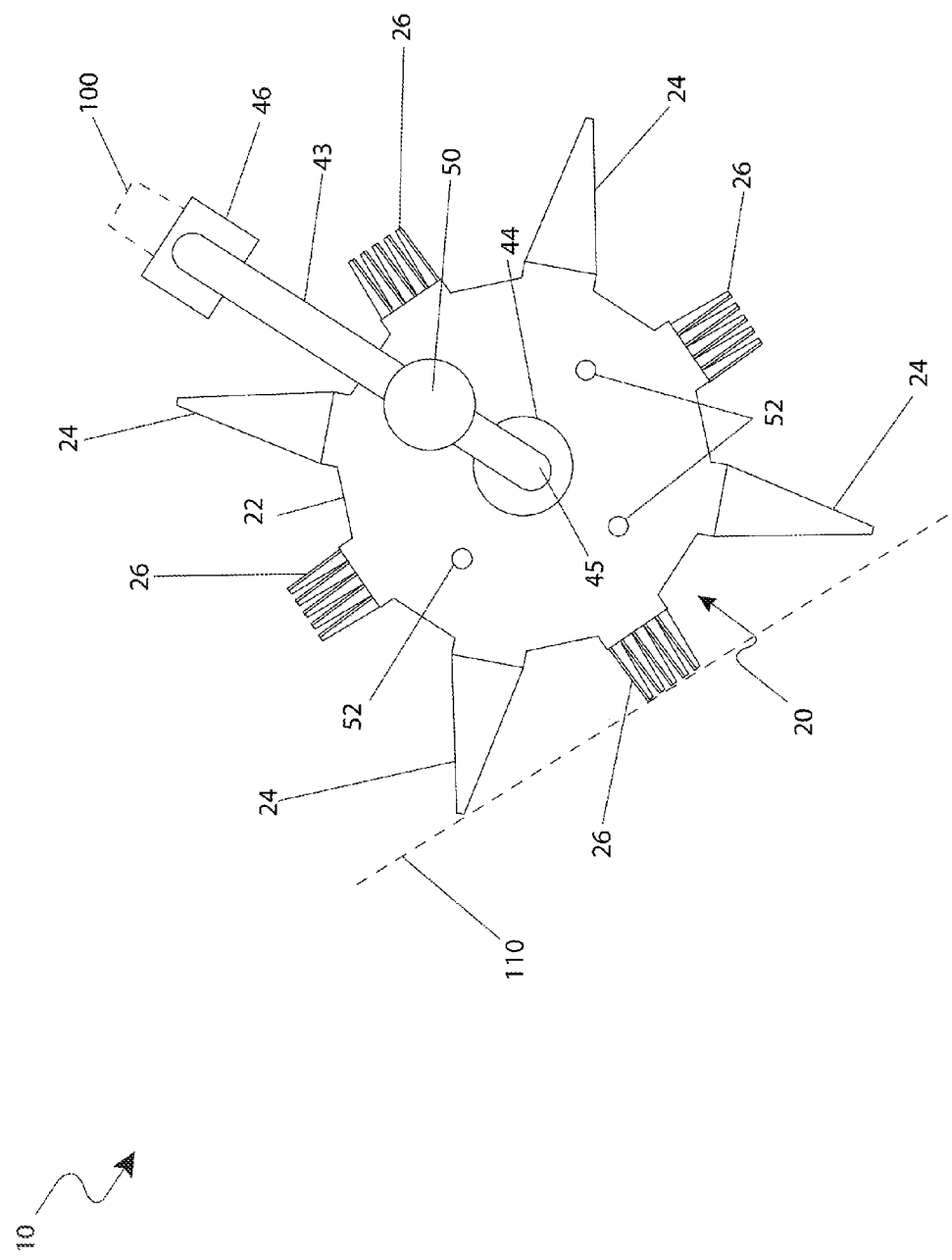
FIG. 2 is an end view of a windshield wiper blade with integral brush 10, according to a preferred embodiment of the present invention; and, FIG. 3 is a front view of a windshield wiper blade with integral brush 10, according to a preferred embodiment of the present invention.
Figure 3:
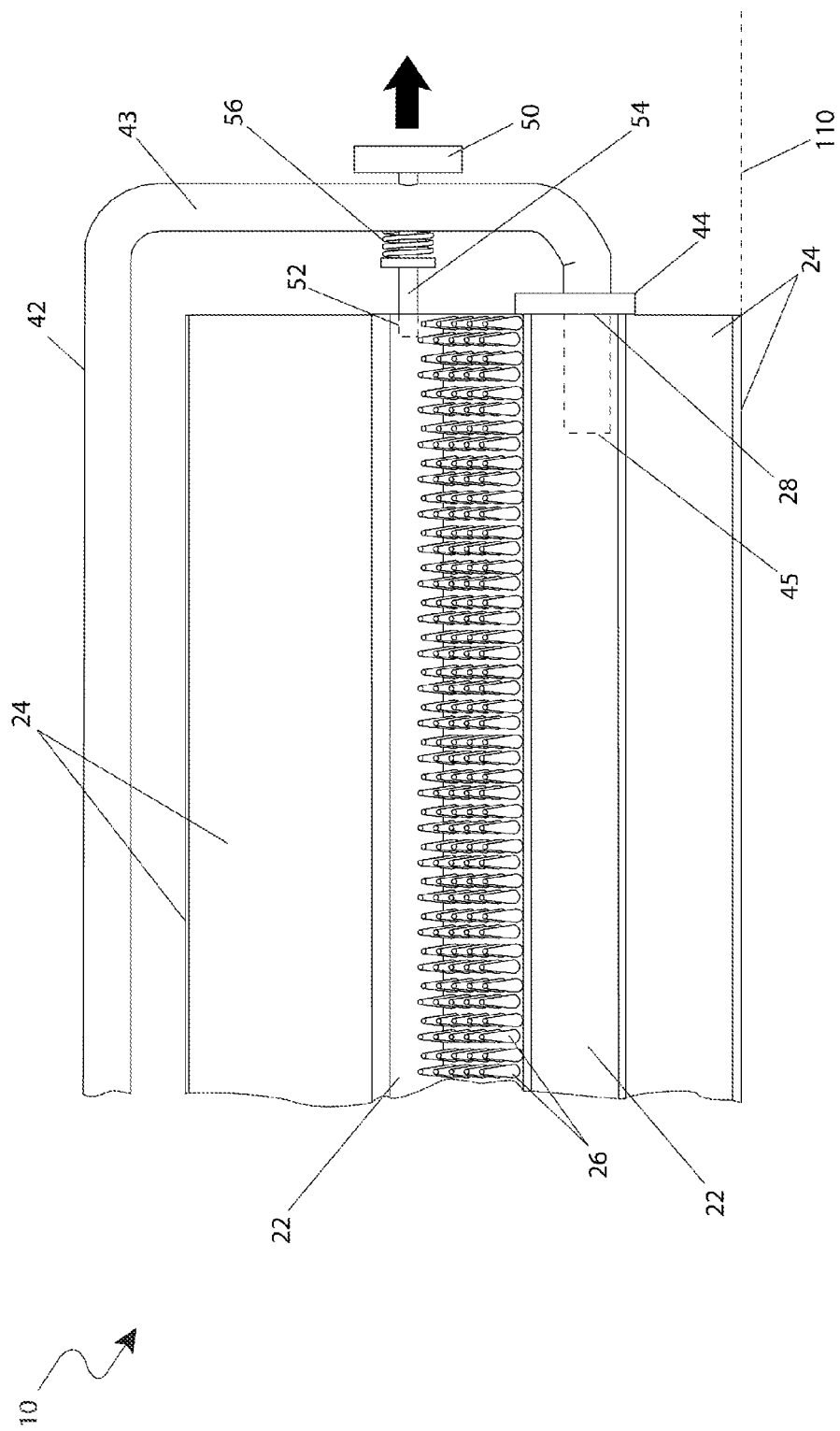

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a windshield wiper blade with an integral brush (herein described as the "device") 10, which provides a four-sided vehicle windshield wiper blade assembly 20 comprising four (4) rubber blades 24 and four (4) bristle brushes 26 arranged in an alternating linear pattern, thereby improving removal of residue from a windshield 110. In such a manner, a windshield surface 110 is contacted coincidentally with two (2) wiper blades 24 and one (1) brush 26, thereby improving removal of debris and residue collected upon a windshield 110. The device 10 allows a user to alternate use of the blades 24 and brushes 26 by rotating and locking the wiper blade assembly portion 20 in ninety degree (90°) increments as needed, thereby extending a useful life of the device 10. The wiper blade assembly 20 is supported and stabilized by a support rod structure 42 which is attached to end portions of said wiper blade assembly 20 and also connected at an intermediate potion to an existing wiper arm portion 100 in a conventional manner. As the wiper blade assembly 20 is used on a windshield 110, the middle brush 26 scrubs the windshield 110, thus removing splattered bugs, tree sap, ice, frost, bird droppings, and the like, while the outer blades 24 sweep water and residue away.

Referring now to FIG. 1, a perspective view of the device 10, according to a preferred embodiment of the present invention, is disclosed. The device 10 comprises a wiper blade assembly 20 and a rod support structure. The wiper blade assembly 20 comprises a cylindrical central cylinder portion 22 which provides an attachment means to the four (4) wiper blades 24 and four (4) brushes 26 which extend in a linear manner along external surfaces of a long axis thereof. The central cylinder portion 22 is envisioned to be made using a flexible plastic or rubber composition being capable of bending and conforming to a curved profile of a common windshield 110. The wiper blades 24 are arranged equidistantly at ninety degrees (90°) from each other having a brush 26 centered between each pair of adjacent wiper blades 24. The wiper blades 24 comprise elongated, tapered, and pointed rubber linear units which extend a length of the wiper blade assembly 20 performing a similar function as conventional replacement wiper blade inserts. The brushes 26 comprise short bristled units extending a length of the wiper blade assembly 20 and are envisioned being made using natural or synthetic equal-length bundled bristles. The brushes 26 comprise bristles which are trimmed to a particular length so as to be coplanar with end portions of the two (2) adjacent wiper blades 24, thereby allowing the two (2) wiper blades 24 and an included brush 26 to rest upon a windshield surface 110 in a flat or slightly curved manner (see FIG. 2). When sufficiently worn or soiled, the wiper blade assembly 20 may then be rotated and secured in an alternate orientation at increments of ninety degrees (90°), thereby positioning a fresh wiper 24 or a fresh brush 26. The orientation of the wiper blade assembly 20 is secured via an assembly made up of four (4) locking apertures 52, a knob 50, and a locking pin 54 (see FIG. 3).

Attachment of the wiper blades 24 and brushes 26 to the central cylinder portion 22 is envisioned to be accomplished using common methods such as, but not limited to: a compound molding process, adhesives, plastic welding, or the like; however, it is also understood that said wiper blades 24 or brushes 26 may be integrally-molded into said central cylinder portion 22 and as such should not be interpreted as a limiting factor of the device 10. Furthermore, said blades 24, brushes 26, and central cylinder portion 22 are envisioned to be molded in a variety of colors and patterns based upon a user's preference.

The rod support structure comprises a plastic or metal elongated generally "C"-shaped member comprising a support rod 42 having a round cross section of approximately one-quarter (¼) inch in diameter which extends a length of the wiper blade assembly 20. The rod 42 is in mechanical communication with rod apertures at end portions of the central cylinder portion 22 of the wiper blade assembly 20 via horizontally oriented insert rods 45 formed at right angles and extending inwardly toward each other approximately one-half (½) inch. The support structure also includes a pair of parallel offset rods 43 extending perpendicularly from ends of the support rod 42. The offset rods 43 comprise a suitable length to position the insert rods 45 into the rod apertures 28 allowing the wiper blade assembly 20 to freely rotate. The insert rods 45 are inserted into the rod apertures 28 in the end surfaces of the central cylinder portion 22 at a center point thereof, thereby allowing free rotation of the wiper blade assembly 20 upon the rod structure. An actual inserted length of the insert rods 45 is defined by respective integral washer-shaped collars 44, thereby providing exact lateral positioning of the central cylinder portion 22 upon said rod structure (see FIG. 3). The rod structure is envisioned to be made using a semi-rigid material capable of allowing the end portions, including the offset rods 43 and insert rods 45, to be spread slightly so as to release the wiper blade assembly 20 therefrom, thereby allowing convenient replacement of said wiper blade assembly 20 when needed. The support rod 42 further provides an attachment to an existing wiper arm 100 portion of a vehicle via an integral wiper arm mounting fixture 46 located along an upper intermediate portion of said support rod 42. The wiper arm mounting fixture 46 is envisioned to provide a universal attachment means having features similar to popular replacement wiper blade units utilizing conversion fittings enabling attachment to standard wiper arm portions 100 found on popular vehicles; however, it is understood that the device 10 may also be introduced in several models, each having a particular wiper arm mounting fixture 46 being specifically designed to attach to a particular vehicle wiper arm design 100 without deviating from the concept and as such should not be interpreted as a limiting factor of the device 10.

Furthermore, the device 10 is envisioned to be sold individually or in pairs having a variety of standard overall lengths corresponding to popular foreign and domestic vehicles in a similar manner as that of conventional replacement wiper blades.

Referring now to FIG. 2, an end view of the device 10, according to a preferred embodiment of the present invention, is disclosed. The device 10 comprises four (4) apertures 52 located on a single end portion of the central cylinder portion 22 which enable a user to selected one (1) of four (4) available rotary positions of the wiper blade assembly portion 20 of the device 10, thereby selecting particular wiper blades 24 and brushes 26 which are to contact the windshield 110. The apertures 52 are arranged at ninety degree (90°) increments, thereby providing positioning of the wiper blade assembly 20 at four (4) different orientations. In use, rotary positioning of the wiper blade assembly 20 is accomplished by retracting the knob portion 50 and rotating said wiper blade assembly 20 (see FIG. 3).

Referring now to FIG. 3, a front view of the device 10, according to a preferred embodiment of the present invention, is disclosed. The device 10 provides a rotary repositioning means of the aforementioned wiper blade assembly 20 with respect to the windshield 110. The device 10 comprises a knob 50, a locking pin 54, and a spring 56. Release of the wiper blade assembly 20 from the rod structure 42 is accomplished via retraction of the knob 50 and locking pin 54 assembly from the four (4) apertures 52, thereby allowing rotary motioning thereof. The spring 56 provides a securing return means, thereby retaining the locking pin 54 into the aperture 52.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 may be achieved by performing the following steps: procuring a pair of devices 10 having a particular length, color, and wiper arm mounting fixture design 46 based upon a user's preference and specific vehicle requirements; removing existing wiper blades in a normal manner; attaching the support rod 42 to an existing wiper arm 100 using the wiper arm mounting fixture portion 46 of the support rod 42; using said pair of devices 10 in a manner similar to normal wiper blades; rotating the wiper blade assembly portion 20 of each device 10 to position a fresh pair of wiper blades 24 or a fresh pair of brushes 26 as needed using the knob 50 and locking pin 54; replacing the wiper blade assembly 20 by slightly spreading the offset rods 43 and removing the insert rods 45 from the rod apertures 28 so as to release the wiper blade assembly 20 therefrom; installing a new wiper blade assembly 20 upon the support rod 42; and, benefiting from improved removal of debris and residue collected upon a windshield 110 as well as experiencing a longer wiper blade life due to the renewable rotary nature of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A windshield wiper assembly comprising:
    an elongated wiper core having an exterior surface and pair of sidewalls;
    a plurality of wiper blades extending longitudinally along said exterior surface;
    a plurality of wiper brushes extending longitudinally along said exterior surface;
    a support structure having a pair of engaging arms removably connected to said wiper core and a mounting fixture removably attached to a wiper arm of a motor vehicle further comprising a support rod having a circular cross section extending the length of said wiper core to distribute a force from said motor vehicle wiper arm; and,
    a locking means to secure said wiper core at a selected plurality of operating positions;
    wherein said wiper assembly removes liquids and particulate debris from a windshield; and
    wherein said pair of engaging arms are disposed on ends of said support rod and further comprises:
        a pair of offset rods extending perpendicularly from said ends of said support rod;
        a pair of insert rods extending perpendicularly from opposing ends of said pair of offset rods; and,
        a pair of collars affixed at an intermediate position on said pair of insert rods;
        wherein said pair of insert rods are removably inserted in a rod aperture in said pair of sidewalls up to said pair of collars, such that said wiper core is rotatable about said pair of engaging arms.

2. The wiper assembly of claim 1, wherein said wiper core further comprises said rod apertures in a center of each respective sidewall to insertingly receive said pair of engaging arms, such that said wiper core is rotatable about said pair of engaging arms.

3. The wiper assembly of claim 2, wherein said wiper core further comprises a cylindrical cross section.

4. The wiper assembly of claim 3, wherein said wiper core further comprises a flexible material to conform to a curved profile of said windshield.

5. The wiper assembly of claim 1, wherein said plurality of wiper blades and said plurality of wiper brushes are in an alternating arrangement on said exterior surface.

6. The wiper assembly of claim 5, wherein at least two of said plurality of wiper blades and at least one of said plurality of wiper brushes are in coincidental contact with a surface of said windshield at each of said selected plurality of operating positions.

7. The wiper assembly of claim 6, wherein each of said plurality of blades is equidistantly spaced along a perimeter of said exterior surface.

8. The wiper assembly of claim 7, wherein said at least one of said plurality of wiper brushes is centered between said at least two of said plurality of wiper blades.

9. The wiper assembly of claim 8, wherein said plurality of wiper blades further comprises four wiper blades disposed at ninety degree intervals and said plurality of wiper brushes further comprises four wiper brushes disposed at ninety degree intervals.

10. The wiper assembly of claim 9, wherein each of said plurality of wiper blades further comprises a flexible, tapered member having a pointed edge.

11. The wiper assembly of claim 9, wherein each of said plurality of wiper brushes further comprises short bristles bundled together.

12. The wiper assembly of claim 1, wherein said locking means further comprises:
    a plurality of locking apertures disposed in at least one of said pair of sidewalls;
    a locking pin slidingly attached to at least one of said pair of engaging arms having a first end protruding through said at least one of said pair of engaging arms and a second end removably inserted in a selected one of said plurality of locking apertures;
    a knob affixed to said first end for a user to engage to slide said locking pin out from said selected one of said plurality of locking apertures; and,
    a spring affixed to an intermediate position of said locking pin to return said locking pin in to said selected one of said plurality of locking apertures.

13. The wiper assembly of claim 12, wherein said selected plurality of operating positions further comprises four positions at ninety degree increments, such that at each of said positions at least two of said plurality of wiper blades and at least one of said plurality of wiper brushes are in coincidental contact with a surface of said windshield.

14. A windshield wiper assembly comprising:
    an elongated cylindrical wiper core having an exterior surface and a pair of sidewalls;
    four wiper blades longitudinally extending said wiper core and equidistantly spaced along a circumference of said exterior surface, said wiper blades comprising a flexible, tapered member having a pointed edge to conform to a curved profile of said windshield;
    four wiper brushes longitudinally extending said wiper core and centered between each wiper blade, said wiper brushes comprising short bristles bundled together;
    a cylindrical support rod extending the length of the wiper core to distribute a force from a motor vehicle wiper arm, said support rod comprising a pair of engaging arms disposed at ends of said rod and a mounting fixture removably attached to said wiper arm; and,
    a locking means to secure said wiper core at four operating positions of ninety degree increments;
    wherein said wiper assembly removes liquids and particulate debris from a windshield;
    wherein said pair of engaging arms further comprises:
        a pair of offset rods extending perpendicularly from said ends of said support rod;
        a pair of insert rods extending perpendicularly from ends of said pair of offset rods; and,
        a pair of collars affixed at an intermediate position on said pair of insert rods;
    wherein a rod aperture in a center of each sidewall insertingly receives said pair of engaging arms, such that said wiper core is rotatable about said pair of engaging arms; and,
    wherein at least two of said wiper blades and at least one of wiper brushes are in coincidental contact with surface of a windshield at each of said selected operating positions.

15. The wiper assembly of claim 14, wherein said locking means further comprises:
    a plurality of locking apertures disposed in at least one of said pair of sidewalls;
    a locking pin slidingly attached to at least one of said pair of offset rods having a first end protruding through said at least one of said pair of offset rods and a second end removably inserted in a selected one of said plurality of locking apertures;
    a knob affixed to said first end for a user to engage to slide said locking pin out from said selected one of said plurality of locking apertures; and,
    a spring affixed to an intermediate position of said locking pin to return said locking pin in to said selected one of said plurality of locking apertures.

16. The wiper assembly of claim 15, wherein said wiper assembly further comprises a material having a preselected color.

* * * * *